June 4, 1963 H. KRAMER 3,092,177
WEB-TO-TUBE FASTENINGS
Filed Dec. 31, 1958
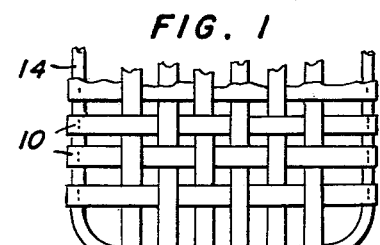
FIG. 1
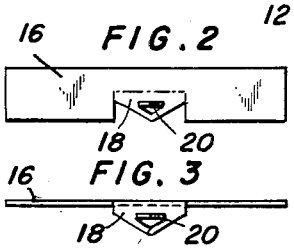
FIG. 2
FIG. 3
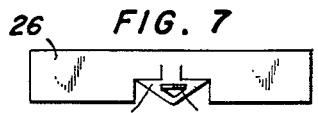
FIG. 7
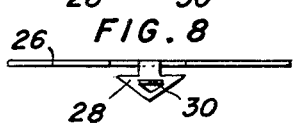
FIG. 8
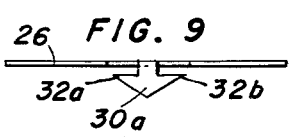
FIG. 9
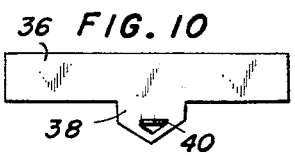
FIG. 10
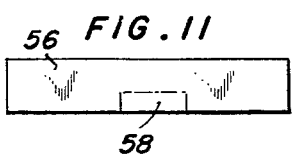
FIG. 11
FIG. 4
FIG. 5
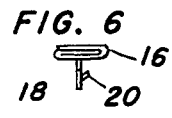
FIG. 6
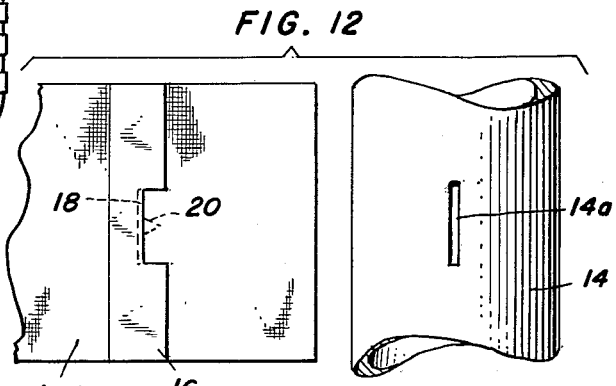
FIG. 12
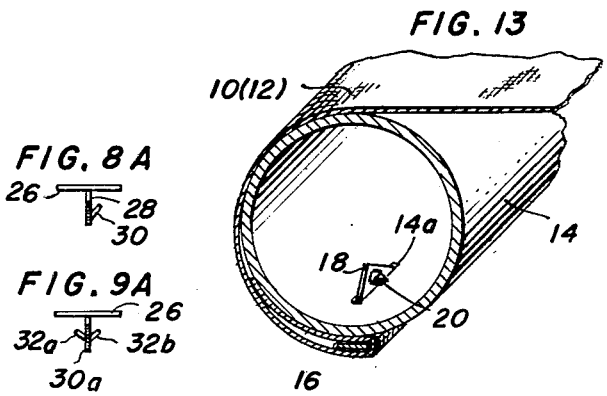
FIG. 13
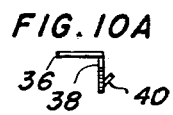
FIG. 8A
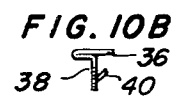
FIG. 9A
FIG. 10A
FIG. 10B
FIG. 11A    FIG. 11B
INVENTOR
HYMAN KRAMER
BY
ATTORNEY United States Patent Office 3,092,177
Patented June 4, 1963

3,092,177
WEB-TO-TUBE FASTENINGS
Hyman Kramer, 2764 E. 16th St., Brooklyn 35, N.Y.
Filed Dec. 31, 1958, Ser. No. 784,280
3 Claims. (Cl. 160—404)

This invention relates to improvements in web-to-tube fastenings, and more particularly to an improved drive-type fastening for securing the ends of the fabric and/or plastic webbing strips now widely used in making up the seat and/or back elements of metal frame furniture to the tubular framing thereof (which for convenience is hereafter called "tubing"), and to an improved fastener for use in such a fastening, the present application being a continuation-in-part of my earlier application Serial No. 763,951, filed September 29, 1958, now Patent No. 2,979,119, granted April 11, 1961 directed to a generally similar fastening and fasteners therefor.

A primary object of the present invention is to provide a fastener of the same high effectiveness and dependability as the fastener according to the various forms thereof disclosed and claimed in my aforesaid application Serial No. 763,951 and which at the same time is simpler in its design and more economical in its construction.

Yet another important object of the invention is the provision of an improved drive-type webbing strip-to-tubing fastener of T-configuration generally as disclosed and claimed in my prior application aforesaid, whose design is such that it may be stamped complete from a flat of sheet material and thereupon but to its final T-shape in an exceedingly simple operation.

Yet another major object of the invention is the provision of a webbing strip-to-tubing fastening which, by making use of a fastener of simple design and inexpensive construction as herein contemplated, is enabled to compete costwise with known fastenings serving similar functioning of which I am aware, and which at the same time is more efficient and durable, and easier to complete, than the known fastenings.

The above and other objects and improved features of the fastening and fastener therefor according to the invention will appear from the following detailed description and accompanying illustrative drawing, wherein—

FIG. 1 is a fragmentary view of a seat (or back) of a piece of metal frame furniture fashioned from interlaced fabric or plastic webbing strips extending crosswise between and secured at their ends to the spaced tubular framing (tubing) thereof as by the fastening of the present invention;

FIG. 2 is a plan view of a fastener blank for one form of fastener as herein proposed following the blanking-out operation but prior to the shank or leg bending operation;

FIGS. 3 and 4 are front elevation and end views, respectively, of the fastener formed from the FIG. 2 fastener blank;

FIGS. 5 and 6 are end views of a fastener similar to that of FIGS. 3 and 4, but whose had part is somewhat modified to provide stiffening effect;

FIGS. 7, 8 and 8A are views corresponding to FIGS. 2, 3 and 4, respectively, which illustrate a somewhat different form of fastener;

FIGS. 9 and 9A are elevation and end views, respectively, which illustrate a slight modification of the FIGS. 7–8A form of fastener;

FIGS. 10, 10A and 10B illustrate yet another form of fastener blank and final fastener of the invention;

FIGS. 11, 11A and 11B are views similar to FIGS. 10, 10A and 10B illustrating a further modified form of fastener blank and final fastener as herein proposed;

FIG. 12 is a fragmentary, separate view illustrating a preassembled fastener (of either of the FIGS. 3, 8, 9 or 11 forms) and webbing strip about to be related to its tubular member for a fastener completing operation; and FIG. 13 is a sectional, broken-away perspective view of the completed fastening.

Referring to the drawings, FIG. 1 generally illustrates a portion of the seat (or back) of a piece of tubular metal frame furniture which is made up of interlaced webbing strips 10, 12 of fabric or plastic, each of which is secured at both its ends to spaced tubing parts 14 constituting the metal frame. The present invention is directed to an improved webbing-strip end-to-tubing fastening and to a fastener of simplified design and inexpensive construction for use therewith.

According to one form of fastener as herein proposed, which is illustrated in FIGS. 2, 3 and 4, such is of T-configuration both in side elevation (FIG. 3) and in end view (FIG. 4), and comprises an elongated, relatively narrow-width head or top part 16 and a vertical leg part 18 constituting the driving shank of the fastener. It is a feature of the present invention that such a fastener is formed complete from sheet material (preferably sheet metal) and that, in the particular form of fastener under consideration, its vertical leg 18 is struck out from the width dimension, i.e. the material forming one longitudinal side-edge portion of the head part 16, as best shown in FIG. 2, and is bent downwardly from said head part so as to depend at an approximate right angle therefrom along a bend line which coincide substantially with the longitudinal center line of the head part, with the result that said leg is contained within a vertical plane extending through said longitudinal center line.

It will be understood that the length of the head part 16 corresponds substantially to the width of the webbing strips to be fastened and that its width, while not unduly critical, will be such as to provide the fastener head part as a whole with the requisite stiffness. The length of the vetrical leg 18 will of course be such as to enable its free or lower end, which is preferably formed to a point, to extend well into the interior of the tubing when driven or forcefully inserted through an opening provided therefor in the tubing wall. The vertical leg is also provided as shown in a locking barb 20 which is disposed sidewardly of the plane of the vertical leg proper and dimensioned both laterally and spacewise from the under side of the fastener head part 16 so as to snap beneath the under side edge or lip of said tubing opening, and thereupon engage against the inside wall portion of said tubing when driven thereinto as aforesaid with a force which increases in accordance with the weight applied to the webbing strip.

Thus, a fastener as described may be formed complete in a single stamping-out operaton which cuts out the vertical leg 18 from one side edge portion of the strip which forms the head part 16 and also forms the locking barb 20, followed by a bending of the vertical leg to its right-angular disposition with respect to the head 16, as may be achieved by a single bending operation. In the event additional stiffening of the fastener head part 16 is considered necessary or desirable, such may be provided by bending over the longitudinal side edge portions of the top part which, for this purpose, may be provided with additional width so that they substantially abut as in FIG. 5 or so that they have overlapping relation as in FIG. 6.

According to the further form of fastener of the invention illustrated in FIGS. 7–8A inclusive, such comprises an elongated head part 26, from the side edge material of which is stamped out a leg 28 which terminates in a pointed end of arrow head configuration which has the locking barb 30 struck therefrom. Otherwise such a fastener is dimensioned and functions similarly to the fastener according to the previously described form, and its head part may also be reinforced and stiffened by bending the longitudinal side edge portions thereof as in FIGS. 5 or 6.

The FIGS. 9 and 9A form of fastener follows the FIGS. 7–8A form as just described except that it omits the locking barb 30 and achieves its self-locking effect as by bending the side points or flukes of the arrow-head end 30a in one or both directions, thus to provide locking barbs 32a, 32b which are adapted to lockingly engage with one or both under lips of the tubing openings upon said vertical leg being driven thereinto.

Referring to FIGS. 10, 10A and 10B, such illustrate yet another form of fastener as herein proposed which may be manufactured in a simple stamping-out operation from sheet metal or equivalent fastener-forming material. In this further form, the fastener blank is initially T-shaped, thus having a head part 36 and a depending vertical leg part 38 whose lower end terminates in a point which is formed with a locking barb 40. To complete the fastener, it is necessary only to bend the head part 36 and leg part 38 to right-angular relationship as in FIG. 10A and preferably thereupon to fold over the longitudinal edge portion of the head part opposite that from which the vertical leg extends so that it extends over the line of said last edge, as results in the fastener being shaped as a T in end view and in the fastener head part being accordingly stiffened.

The further form of fastener illustrated in FIGS. 11–11B inclusive generally follows as to its fabrication procedure that of the FIGS. 2–4 fastener, i.e. the vertical leg 58 is struck out from one longitudinal side edge portion of the head part 56. However, instead of the leg being formed to a point and being provided in its pointed end with a locking barb corresponding to that designated 20, the free end of the leg is left square and is turned or curled upwardly on itself, thus to provide an upwardly facing hook 60 which is adapted, upon the fastener leg being forcefully inserted through its tubing opening, to lockingly engage with the under edge or lip of the tubing opening. Thereupon, as with the FIGS. 10–10B form, the opposite longitudinal side edge portion of the head part 56 may be folded over on said edge portion from which the vertical leg 38 is struck, as in FIG. 11B, thus to stiffen the head portion and fastener as a whole.

A fastener of any one of the above described forms may be simply associated with the end of a webbing strip which it is to secure either by forcing its vertical leg through the webbing strip material, or through a pre-cut slit provided therein, at a location which is preferably set back about an inch from the terminal or end edge of the webbing strip, as is generally shown in FIG. 12, which view also illustrates the tubing 14 to be provided with a fastener leg-receiving opening 14a. When the fastener is associated with a webbing strip end as aforesaid, the webbing strip with a fastener applied to each end constitutes a sub-assembly unit capable of being supplied as such to the operator who or machine which completes the fastening. To further reduce the cost per unit fastening, the fasteners may be formed complete and assembled one at each end to a webbing strip in an automatic machine operation supplying the sub-assembly webbing strips with fasteners attached from metal strip and webbing strip blanks feeding thereto.

A fastener of the invention makes possible a completed webbing-strip-to-tubing fastening as generally illustrated in FIG. 13. In such a fastening, the webbing strip end is secured in the first instance by the vertical leg (18, 28, 30a or 38) of the fastener extending through the tubing opening 14a and thereupon self-locking itself to one or both of the under edges or lips of said opening through the locking action provided by the barbs 20, 30 or 40, or by the oppositely bent flukes 32a, 32b or by the hook 60, all as aforesaid. Consequent to the fastener being applied to the webbing strip end at a point or location which is set back from the end edge thereof as aforesaid and to the resulting free end-portion being folded under the webbing strip proper in the final fastening as shown in FIG. 13, additional holding effect is provided by the fact that said under-folded portion of the webbing strip (which forms a partial wrap about the tubing) is pressed tightly against the peripheral surface thereof by the overlapping portion of the webbing strip proper with a force which increases with the weight carried by said webbing strip. Yet a further holding action on the webbing strip is supplied by the fact that as the webbing strip is tensioned by the load placed thereon, the fastener tends to cock sidewardly as results in the relatively rearward edge zone of the fastener top part bearing tight against the underlapping end portion of the webbing strip. The final result is a fastening which is notable for its webbing strip holding action, as well as a fastening having self-locking action whereby it is capable of securing its webbing strip to the tubing without dependence on whether or not the webbing strip is in a state of tension.

Without further analysis, it will be appreciated that the above described webbing strip-to-tubing fastening and the various forms of fastener for use therewith as described above achieves the objectives of the invention explained in the foregoing. However, various changes could be made in carrying out the above construction without departing from the scope of the invention. For example, any appropriate fastener head-stiffening means may be employed in place of those illustrated, and structurally different locking means may also be substituted provided they function as the locking means specifically disclosed. Also to be noted is that the fastener according to the various forms herein proposed, although shown to be of the individual or unit type, may also be made up in strip form in which the head parts of plural fasteners are connected in tandem in end-to-end relation as suggested in my aforesaid application Serial No. 763,951, thus to effect the fastening of one-piece seat and/or back panels to their frame tubing parts.

Accordingly, it is intended that all matter contained in the above description or shown in the accompanying drawings shall be interpreted as illustrative and not in a limiting sense.

I claim:

1. In tubular-frame furniture construction, a webbing strip-to-tubular frame-fastening assembly comprising the combination of a tubular frame member having a generally elongate opening in its wall which extends axially with respect to said frame member, a flexible webbing strip having an end portion arranged in doubled-over relationship and extending as partial outer and inner wraps about a portion of the frame member and a fastener securing said doubled-over end portion to the frame member, said fastener having general T-configuration at least in front elevation and comprising an elongated bar-like head part having length corresponding substantially to the width of the webbing strip and a prong-like shank part depending from the middle-length portion of the head part and being contained in a plane which extends longitudinally from end-to-end of the head part, said webbing strip end portion being doubled over on itself about one longitudinal side edge of the head part and the shank part passing through the inner wrap of said doubled-over end portion and thence through the tubing-wall opening wherein it is disposed in substantial alignment with the latter, the free end of the shank part terminating in a V point thereby to facilitate its passage through both the webbing strip under-wrap portion and said tubing-wall opening and being provided with a locking barb comprising an area cut out from said pointed end and which inclines sidewardly-upwardly away from the plane of said shank part and toward a longitudinal side edge of the head part, said locking barb serving the dual purpose of initially securing the fastener to the webbing strip in the preassembly of the fastener thereto and thereupon, responsive to movement of the pointed end of the shank part through said tubular-member opening to a depth such that the free edge of the barb engages the inside wall surface of the tubular frame member adjacent its said opening, of securing the fastener and thereby the webbing strip to the tubular member.

2. A webbing strip-to-tubular frame fastening assembly according to claim 1, wherein the free edge of the locking barb is spaced from the under side of the fastener head part a distance corresponding substantially to the thickness of the wall of the tubular frame member adjacent the aforesaid opening.

3. A fastener for securing an end portion of a flexible webbing strip arranged in doubled-over relation to the tubular frame member of a chair and the like provided with a generally elongated opening extending axially of said member, said fastener comprising an elongated bar-like head part having length corresponding substantially to the width of the webbing strip to be secured about a longitudinal side edge of which said strip is adapted to be doubled back on itself, and a prong-like shank part integral with and depending from the middle-length portion of said head part and being contained in a plane which extends longitudinally from end to end of said head part, said shank part terminating in a V point thereby to facilitate both its penetration of the webbing strip at a point set back from the end edge of the latter and its passage through said opening in the tubular frame member and being further provided with a locking barb comprising an area cut out from the pointed end of said shank part and which inclines sidewardly-upwardly away from the plane of said shank part and toward a longitudinal side edge of said head part, said locking barb serving the dual purpose of initially securing the fastener to the webbing strip end when preassembled thereto and thereupon, upon assembly of the fastener to the tubular frame member, of securing the fastener and thereby the webbing strip end portion to said tubular frame member.

References Cited in the file of this patent

UNITED STATES PATENTS

| 2,126,482 | Lombard | Aug. 9, 1938 |
| 2,143,603 | Lombard | Jan. 10, 1939 |
| 2,238,854 | Wagstaff | Apr. 15, 1941 |
| 2,319,058 | Hansman | May 11, 1943 |
| 2,395,761 | Reed | Feb. 26, 1946 |
| 2,845,671 | Fisher et al. | Aug. 5, 1958 |
| 2,884,994 | Rosalsky | May 5, 1959 |
| 2,937,696 | Arnold | May 24, 1960 |
| 2,957,219 | Van Buren | Oct. 25, 1960 |

FOREIGN PATENTS

| 536,582 | Great Britain | May 20, 1941 |